June 16, 1925.
1,542,051
C. L. GEDNEY
CIRCUIT BREAKER FOR MOTOR VEHICLES
Filed July 27, 1921
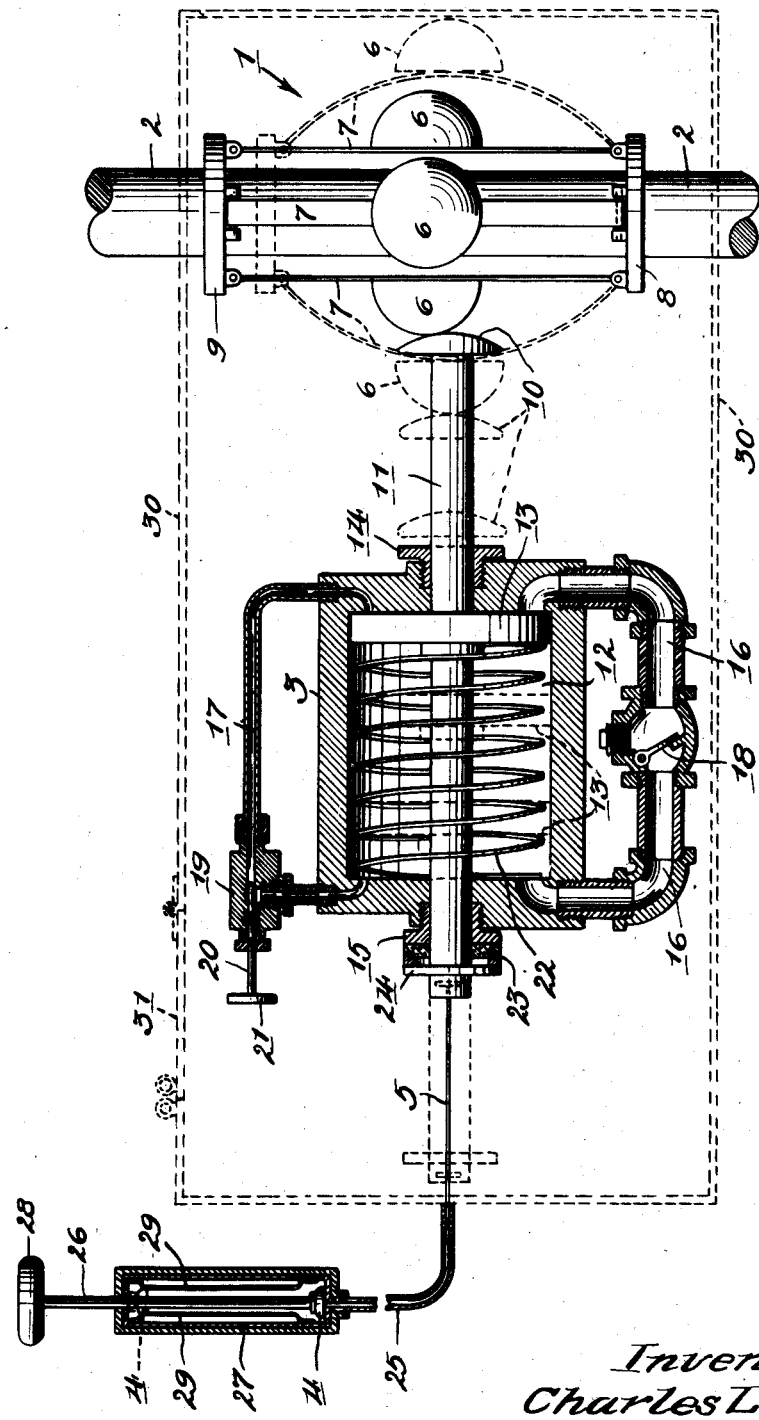
Inventor:
Charles L. Gedney,
by: John E. Stryker
his Attorney.

Patented June 16, 1925.

1,542,051

UNITED STATES PATENT OFFICE.

CHARLES L. GEDNEY, OF ST. PAUL, MINNESOTA.

CIRCUIT BREAKER FOR MOTOR VEHICLES.

Application filed July 27, 1921. Serial No. 487,830.

*To all whom it may concern:*

Be it known that I, CHARLES L. GEDNEY, a citizen of the United States, residing at St. Paul, in the county of Ramsey and State of Minnesota, have invented new and useful Improvements in Circuit Breakers for Motor Vehicles, of which the following is a specification.

The drivers of motor vehicles and particularly truck drivers frequently, and sometimes for long periods of time, allow the motor to run when the vehicle is stationary. This idling of the motor results in unnecessary waste of fuel.

It is my object to obviate this waste by providing automatic means to prevent the vehicle motor from idling longer than a predetermined time.

A further object of my invention is to provide a device of this kind with means for changing the length of times that such motor may be allowed to idle.

Other objects will appear and be more fully pointed out in the following specification and claims.

In the drawing, which illustrates the best form of my device now known to me, my improved circuit breaker is illustrated in plan view, partially in section. The device consists generally of a governor 1 mounted upon the drive shaft 2 of the motor vehicle, a dash pot 3, adapted to be actuated by said governor and a manually operated plunger 4 adapted to be mounted upon the instrument board or cowl of the vehicle and connected to the dash pot piston rod by a flexible connector 5. The governor 1 is of the fly ball type comprising a series of weights 6 mounted upon flexible supports 7 on the shaft 2. The supports 7 are pivotally connected at one end to a collar 8 which is fast on the shaft 2 and at the other end to a collar 9 which is slidable longitudinally on said shaft. The governor is mounted between the transmission gears and differential of the vehicle so that the shaft 2 rotates only when the vehicle is moving.

The weights 6 when rotated bear upon a mushroom head 10, formed on the adjacent end of the dash pot piston rod 11 and said piston rod passes axially through a cylinder 12. A piston 13 is fast on the rod 11 within the cylinder 12 and said cylinder is adapted to contain a liquid, preferably one of substantially constant volume such as kerosene. Stuffing boxes 14 and 15 are provided at each end of the cylinder around the piston rod 11 to prevent escape of the liquid from within said cylinder. Two conduits 16 and 17 connect opposite ends of the cylinder 12 and valves 18 and 19 are positioned in said conduits, respectively. The valve 18 allows liquid to pass freely from the left to the right side of the piston 13 but prevents the passage of liquid in the reverse direction. The valve 19 is of common type having a spindle 20 which is threaded in the valve casing. The inner end of said spindle is cone shaped and provided with a seat in the casing and its outer end is provided with a knob 21 for turning the spindle to adjust the opening of the valve. A large coiled spring 22 tends to move the piston 13 to the extreme right end of its stroke within the cylinder 12.

Insulated from the adjacent mechanism is a metallic ring 23 which encircles the piston rod 11 near the packing nut 15. This ring 23 is adapted to be connected in circuit with the magneto of the motor so that by connecting said ring electrically with the piston rod 11 the circuit will be grounded and the motor will be stopped. A collar 24, on the piston rod 11, is adapted to make electrical contact with the ring 23 when the piston is at the right end of its stroke. The piston rod 11 is hollow and its end adjacent to the collar 24 is connected, by the flexible connector 5, with the plunger 4, said connector being guided within a tube 25. The plunger 4 is fast on one end of a spindle 26 and is adapted to be moved longitudinally within a casing 27 by a knob 28 on the opposite end of said spindle. Rigidly mounted within the casing 27 and insulated therefrom, is a pair of flexible contact strips 29. These strips, like the ring 23, are connected in an independent ignition system circuit which, when completed, will stop the motor. When the strips 29 are connected electrically with each other the circuit is completed.

In use the governor 1 and dash pot 3 are completely enclosed in a steel housing indicated in dotted lines at 30 in the drawings and the ignition system wires connected to the ring 23 and contact strips 29 are enclosed in a suitable protected cable. A door, indicated at 31, in the housing 30, is adapted to be sealed to prevent access by unauthorized persons to the adjusting valve 19.

Operation.

In operation the needle valve 19 is preferably adjusted so that it requires from one to five minutes for the piston 13, under the action of the spring 22, to force liquid from the right to the left side of said piston through the conduit 17.

When it is desired to start the motor the plunger 4 is withdrawn to its dotted line position by manipulating the knob 28 and then returned to its full line position. This manipulation, by means of the flexible connector 5, draws the piston 13 to the extreme left of its stroke, the liquid in the cylinder 12 passing freely through the conduit 16 from the left to the right side of said piston. As the plunger 4 is returned to its full line position the connector 5 passes into the hollow rod 11. The spring 22 now moves the piston 13 slowly to the right and before the collar 24 makes contact with the ring 23 the vehicle must be in motion, otherwise ignition will be prevented. By adjusting the valve 19 the desired amount of time for starting the engine and vehicle is allowed. As soon as the vehicle is in motion the governor 1 acts; the weights 6 move outward under centrifugal force and impinge against the mushroom head 10 to move the piston rod 11 to the left and hold the collar 24 out of contact with the ring 23. When the vehicle is brought to a stop the motor can only be idled for the period required for the piston 13 to force the liquid through the conduit 17 and valve 19 to the left side of the piston, i. e., until the collar 24 is brought in contact with the ring 23. If an attempt is made to prolong idling of the motor by manipulating the knob 28 to hold the circuit open between the collar 24 and ring 23 the plunger 4 will complete the circuit between the contact strips 29. This breaks or grounds the ignition circuit and makes idling the motor for long periods impossible.

Having described my invention what I claim as new and desire to protect by Letters Patent is:

1. In a device of the class described, a governor adapted to be mounted on the drive shaft of a motor vehicle, a dash pot actuated by said governor, a switch actuated by said dash pot and adapted to be connected in an ignition circuit of the vehicle motor, and a manually operated plunger connected with said dash pot to permit manual operation of said switch.

2. In a device of the class described, a dash pot, a switch actuated by said dash pot and adapted to be connected in a circuit with the vehicle motor, a manually operated plunger connected with said dash pot and means for actuating said dash pot independently of said plunger when the vehicle is at rest.

3. In a device of the class described, a dash pot having a spring actuated piston, an adjustable valve to dampen movement of said piston in one direction, manually operated means for moving said piston in the opposite direction, a switch actuated by said piston and adapted to be connected in an ignition circuit of the vehicle motor, and means for pushing said piston against the action of said spring when the vehicle is in motion.

4. In a device of the class described, a cylinder adapted to be filled with a liquid, a piston in said cylinder, a conduit for liquid between the ends of said cylinder, a spring to resiliently hold said piston at one end of its stroke, a switch adapted to be actuated to stop the vehicle motor when said piston is in a predetermined position, means for holding said piston out of said predetermined position when the vehicle is in motion and manually operated means for drawing said piston temporarily out of said predetermined position when the vehicle is stationary.

5. In a device of the class described, a cylinder adapted to be filled with a liquid, a piston in said cylinder, a conduit for liquid between the ends of said cylinder, an adjustable valve in said conduit, a spring to move said piston to one end of its stroke, a switch adapted to be moved to stop the vehicle motor when said piston is at said end of its stroke, means for holding said piston away from the end of its stroke when the vehicle is in motion and manually operated means for temporarily pulling said piston away from the end of its stroke when the vehicle is stationary.

6. In a device of the class described, a cylinder adapted to be filled with liquid, a piston in said cylinder, a conduit for liquid between the ends of said cylinder, a valve in said conduit, a spring to move said piston to one end of its stroke, a switch adapted to be actuated to stop the vehicle motor when said piston is at said end of its stroke, means for holding said piston away from the end of its stroke when the vehicle is in motion, a manually operated plunger for temporarily moving said piston away from the end of its stroke when said vehicle is stationary and a switch actuated by the plunger and arranged in the motor ignition circuit to stop the motor when said plunger is manipulated.

7. In a device of the class described, a cylinder adapted to be filled with a liquid, a piston in said cylinder, large and small conduits for liquid between the ends of said cylinder, valves in said conduits, the valve in the smaller conduit being adjustable, a spring to move said piston to one end of its stroke, a switch adapted to be actuated to stop the vehicle motor when said piston is at said end of its stroke, means for holding said piston away from the end of its stroke when the vehicle is in motion and manually operated means for temporarily moving said piston away from the end of its stroke when said vehicle is stationary.

8. In a device of the class described, a switch adapted to be connected in an ignition circuit of a motor vehicle, resilient means for normally holding said switch in position to render the ignition system inoperative, and manually operable means and means actuated by the motor of said vehicle to move said switch from said position.

In testimony whereof, I have hereunto signed my name to this specification.

CHARLES L. GEDNEY.